United States Patent [19]

Brown

[11] 4,138,890
[45] Feb. 13, 1979

[54] TEMPERATURE INDICATING PROBE

[76] Inventor: Joseph W. Brown, P.O. Box 385, Blue Springs, Mo. 64015

[21] Appl. No.: 803,030

[22] Filed: Jun. 3, 1977

[51] Int. Cl.² .......................... G01K 1/08; G01K 1/14; G01K 13/02
[52] U.S. Cl. ...................................... 73/374; 73/372; 128/214 E
[58] Field of Search .................. 73/349, 371, 372, 374; 128/2 H, 194, 214 A, 214 E, DIG. 13

[56] References Cited

U.S. PATENT DOCUMENTS

| 879,474 | 2/1908 | Kessling | 73/374 |
| 1,983,166 | 12/1934 | Chaney et al. | 73/374 |
| 2,109,825 | 3/1938 | Kashiwagi | 73/374 |
| 2,261,828 | 11/1941 | Brown et al. | 73/374 |
| 2,356,607 | 8/1944 | O'Brien | 73/349 |
| 2,460,051 | 1/1949 | Welch | 73/374 X |
| 2,837,919 | 6/1958 | Chaney | 73/374 |
| 3,246,521 | 4/1966 | Humphrey | 73/374 |

*Primary Examiner*—Charles Gorenstein
*Attorney, Agent, or Firm*—Fishburn, Gold & Litman

[57] ABSTRACT

A temperature indicating probe comprises a liquid-in-glass thermometer encased in a clear plastic housing having a magnifying lens portion facing the thermometer tube to facilitate quick and acurate reading. The housing includes a series of tapered, cylindrical shaped portions separated by a step or shoulder, which are respectively insertable into variously sized standard medical appliance line openings or fittings, for sensing and indicating the temperature of the working fluids being carried through the line.

3 Claims, 4 Drawing Figures

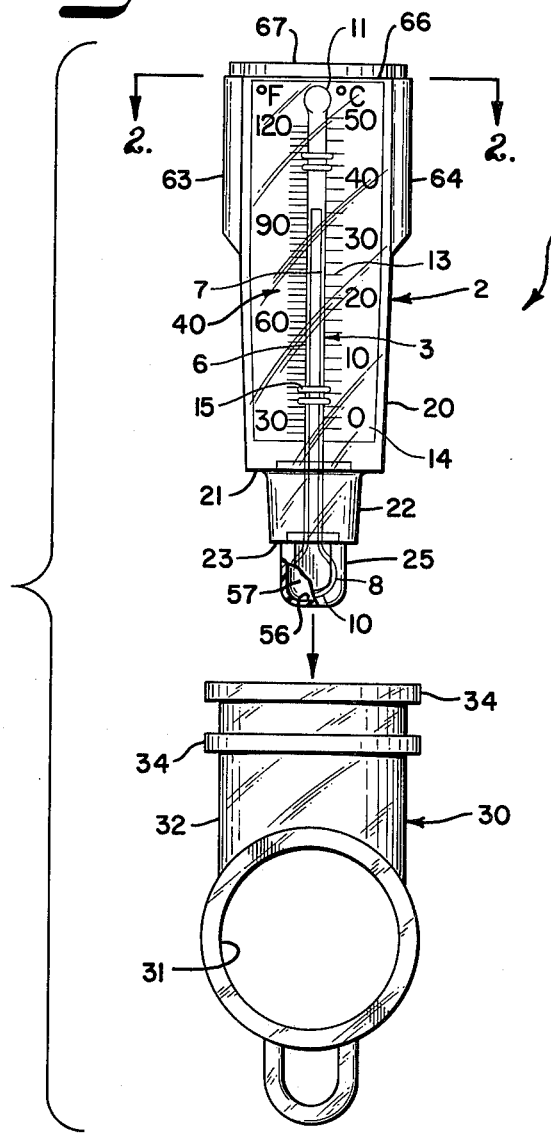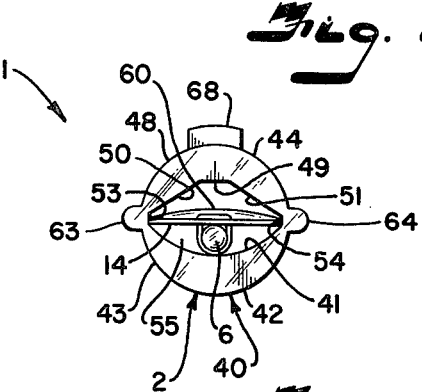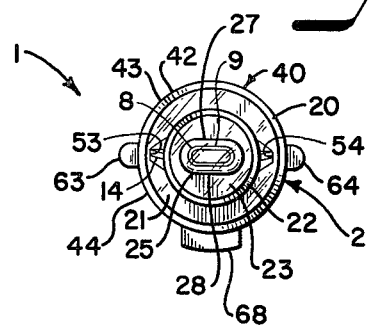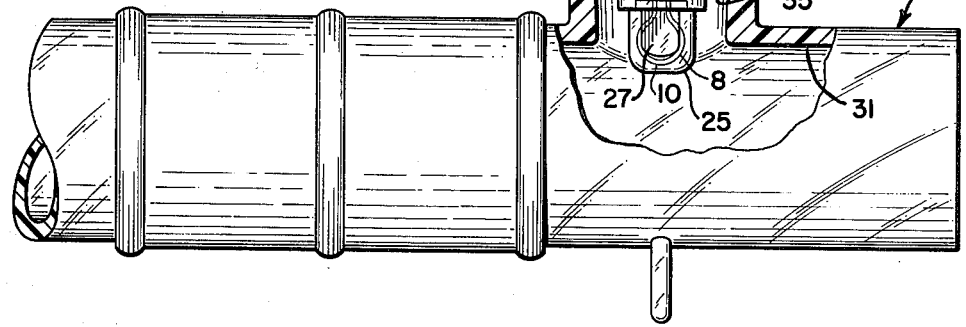

TEMPERATURE INDICATING PROBE

This invention relates to temperature indicating probes or devices for use in standard medical material supply lines.

Medical requirements generally dictate that certain hospital and patient care appliances be periodically monitored for the temperature of materials such as air or fluids being supplied thereby. For example, it is often necessary that air or fluids be supplied at the correct temperature from a nebulizer, a dialysis machine, a heart by-pass apparatus, or into an infant incubator or thermal blanket. Typically, a nebulizer supplying humidified air through tracheotomy tubes to a patient may deliver air having a wide range of temperatures, but it is necessary that the temperature be controlled to permit only warm moist air to reach the patient.

The present invention comprises a temperature indicating device encased within a protective housing, which is insertable into openings in standard medical appliance supply lines for indicating the temperature of the working material being transmitted through the line. To reduce handling and sterilization costs, the assembly is inexpensively fabricated from relatively low-cost materials, thereby enabling the device to be disposable without great expense to the buyer and/or user.

The principal objects of this invention are to provide a temperature indicating device adapted for insertion into an opening in a working material supply lines; to provide such a device having a lens portion for promoting visual ease in noting the temperature indication; to provide such a device having a protective housing for resisting breakage of the device and to prevent contamination of the working materials; to provide such a device which reliably indicates the temperatures of the working materials; to provide such a device having multi-diameter collars for connection with variously sized supply lines and hardware; to provide such a device having side ribs for connecting said device securely yet detachably with said line; and to provide such a device which is sturdy, efficient in use, and particularly well adppted for its intended purpose.

Other objects and advantages of this invention will become apparent from the following description taken in connection with the accompanying drawings wherein are set forth, by way of illustration and example, a certain embodiment of this invention.

FIG. 1 is an elevational view of a temperature indicating probe embodying the present invention having portions broken away to show details of the interior construction, and a tee-connector in disassembled relation.

FIG. 2 is a top plan view of the probe taken along lines 2—2, FIG. 1.

FIG. 3 is a bottom plan view of the probe.

FIG. 4 is an elevational view of the temperature indicating probe positioned in the tee-connector, the connector having portions broken away to reveal interconnection details.

Referring more in detail to the drawings, the reference numeral 1 generally designates a temperature indicating probe embodying the present invention. The probe 1 includes a hollow tube member or housing 2 having temperature indicating means such as a thermometer 3 positioned therein. The illustrated thermometer 3 comprises a liquid-in-glass type of thermometer having an elongated tube member 6 with a capillary bore 7 and a bulb 8 with flattened, substantially parallel sides 9. The bulb 8 is positioned at one end 10 of the tube member 6, and is sealed at the other end 11. The thermometer 3 contains a suitable fluid such as mercury, alcohol, or the like, and the air is exhausted from the tube. A graduated scale 13 having printed numeral indicia thereon is provided to measure expansion differences between the fluid and the tube 6. The numbered scale 13 is on a planar card member 14 or strip and attached to the tube 6 by suitable fasteners or connecting means 15 such as wire wraps or clips to hold the tube 6 and the bulb 8 in a constant position relative to the card 14, preventing relative rotation, and is so placed and so subdivided that the number corresponding to the top of the fluid column indicates the temperature. The scale 13, in this example, includes numerals corresponding to degrees Fahrenheit on one side and to degrees Centigrade on the other side of the tube 6 although virtually any suitable scale may be employed.

The thermometer 3 is encased within a clear plastic hollow housing 2 comprising a vertically extending cylinder or barrel member and preferably having a stepped structure or spaced portions for fitting and sealingly mounting the probe in differently sized and shaped fittings or hardware. In the structure illustrated, the housing 2 has a slightly tapered portion 20, frustroconical in shape, which is disposed intermediate to the bottom 25. The portion 20 terminates in a circumferential inwardly directed step or shoulder 21 adjoining a second slightly tapered portion 22 of lesser diameter than the portion 21. The second portion 22 terminates in a second circumferential inwardly directed step 23 which embraces the bottom 25. The bottom 25 comprises an axially aligned, hollow, projecting member for receiving the bulb 8 of the thermometer 3 therein and has flattened and thinned front and back walls or sides 27 and 28 permitting a high degree of thermal conductivity for the transfer of heat energy therethrough and into the bulb 8, providing relatively rapid response to temperature changes. The size of the probe 1 varies with the intended application, and the illustrated tapered portions 20 and 22 have respective diameters of 15 and 10 mm to insertably extend and sealably force fit into the passage member openings of standard medical appliance fittings of 15 or 10 mm, for example, crosses, tees or other suitable connectors. It is foreseeable that a housing could include more than two such tapered portions 20 and 22. A series of three, four, or even five portions of progressively lesser diameter adaptable to fit differently sized appliance fittings may be provided. By way of example, FIGS. 1 and 4 illustrate the probe 1 in both disassembled and assembled positions respectively inserted into a 15 mm fitting or passage member 30. The illustrated fitting is a tee-connector having a tubular passage 31 connected to an air or fluid, or working material, emitting apparatus (not shown) or other source of materials. Extending laterally from the passage 31, a tubular portion or opening 32, having external peripheral strengthening ribs or ridge members 34, accepts insertion and sealable force fit of the 15 mm portion 20 thereinto. The tubular portion or opening 32, in this example, has a slight downwardly and inwardly directed tapered interior surface 35 having a coordinating angular relation to the tapered portion 20, providing mutual mating and sealing surfaces when the housing 2 is inserted thereinto. In this example, both tapered surfaces 20 and 32 are frustroconical in shape and form a secure, airtight seal therebetween. The bottom 25 of the housing communicates with the passageway 31 in the fitting 30, and as best illustrated in FIG. 4, the bottom of the illustrated housing extends slightly into the passageway.

The hollow housing 2 includes a transparent strengthening and magnifying lens portion 40, facing the front of the thermometer 3 and extending longitudinally down the length of the housing 2 and terminating at the shoulder 21. The lens 40, in this example, is formed by two opposite interior and exterior, contoured walls or surfaces 41 and 42 of converging concavo-convex, or converging meniscus design, whereby the visual image of the tube 6 and numbered scale 13 is magnified when viewed through the lens 40. The lens portion 40, as illustrated, comprises a cresent shaped segment 43 of the housing 2, disposed adjacent to the front of the scale, and the opposite and remaining strengthening segment 44 faces the rear of the thermometer 3 and also extending longitudinally the length of the housing 2, The semi-cylindrical segment 44 includes a regular exterior surface 48 and an interior surface 49 forming angled and diverging buttresses or strengthening portions 50 and 51, each buttress portion 50 and 51 terminates at the juncture thereof with the opposing points of convergence of the lens 40 to form opposed longitudinal grooves 53 and 54. The interior walls 41 and 49 are separated by the grooves 53 and 54, and define a chamber 55 which extends longitudinally and substantially along the length of the housing 2 into the bottom 25. The card 14, which retains the tube 6, is positioned in the chamber 55, and the side edges thereof are slidably engaging in the grooves 53 and 54 to keep the card 14 in a constant vertical plane facing the lens 40. The width of the illustrated card is slightly larger than the distance between the grooves 53 and 54 for frictionally connecting the card therein. The flattened opposite sides 9 of the bulb 8 extend into and embrace the bottom 56 and the flattened opposite sides 57 of the chamber portion of the bottom 25. The card 14 has a slight lower end lateral curving portion 60 permitting the bulb 8 of the tube 6 attached thereto to extend into the axially aligned bottom 25, the grooves 53 and 54 being oppositely positioned on the circumference of the housing 2 and the tube 6 being slightly offset from the surface of the card 14.

Extending longitudinally partway down the exterior length of the housing are two rounded ridge-like projections or rib members 63 and 64 oppositely posed at the junctures of the exterior surfaces 42 and 48 and opposite the chamber grooves 53 and 54. The rib members 63 and 64 provide gripping portions for rotatably turning in a vertical plane and press fitting the probe 1 into the tubular portion or opening 32 of the passage member 30, FIG. 4.

The top 66 of the housing 2 is protectively sealed by a circular portion of sponge tape or cover member 67 having, in this example, an adhesive substance on both upper and lower surfaces enabling the probe 1 to be removably adhered to a smooth surface if desired. A rectangular portion 68 of the tape adheres to the rear exterior surface 48 and also providing a means for attachment to suitable surfaces.

It is to be understood that while one form of this invention has been illustrated and described, it is not to be limited to the specific form or arrangement of parts herein described and shown, except insofar as such limitations are included in the following claims.

What is claimed and desired to be secured by Letters Patent is:

1. A temperature responsive device for single patient use in measuring and indicating the temperature of a working fluid flowing in a patient care appliance from a source thereof, through a passage in a transmitting member to a patient, said device comprising:
    (a) a fitting member connected with said transmitting passage and having a tubular portion thereof extending laterally from said transmitting member, and including an open end thereof communicating with the passage in said transmitting member; said tubular portion having a smooth, frusto-conically shaped inside surface tapering outwardly toward the open end thereof;
    (b) a one-piece elongated housing of synthetic resin having a first portion adjacent one end thereof with an outside surface including a smooth, frustroconical shape which is tapered inwardly toward said one end, and mates with said tapered inside surface of said tubular portion and cooperates therewith to provide a non-threaded, rotatably engaged, frictional force fit to secure an airtight seal with said one end, which extends adjacent to said passage, and contacts the working fluid therein;
    (c) said housing having a second portion thereof extending from said first portion to an other end; said housing having walls defining a first chamber extending from an open end at the other end of said second portion to adjacent the housing first portion, and a second chamber communicating with said first chamber and extending therefrom in said first housing portion and terminating in a closed end adjacent said one end of the housing;
    (d) said housing walls having rib members on an exterior side of the second portion, and extending longitudinally therealong for gripping and rotatingly inserting and frictionally retaining said housing with said fitting to form said airtight seal;
    (e) said housing walls defining said second chamber having opposed guide portions on the interior thereof and extending substantially the length of said first chamber;
    (f) a liquid thermometer having a bulb portion thereof disposed in said second chamber in contact with inner surfaces adjacent said closed end, whereby the temperature of said working fluid is detected by said thermometer; and
    (g) said thermometer includes a planar scale member having numeral indicia thereon; said scale member being connected to the thermometer in spaced apart relation to said bulb and having side edge portions slidably engaged in said guide portions to position said thermometer and scale member in facing relation to one side portion of the housing walls; said one side portion being transparent and shaped with contoured interior and exterior surfaces to form an elongate magnifying lens portion for enlarging said numeral indicia.

2. A temperature response device as set forth in claim 1 wherein:
    (a) said second chamber has flattened opposed sides adjacent said closed end; said flattened sides being substantially parallel to the scale member when side edge portions thereof are engaged in said guide portions; and
    (b) said bulb portion of the thermometer having flattened sides to be accomodated and embracingly engaged by the flattened sides of said second chamber for preventing relative rotation and retaining the thermometer in position for viewing through said magnifying lens.

3. A temperature responsive device as set forth in claim 1 wherein:
said housing includes a third portion disposed between said first and second portions having an outside surface thereof tapered inwardly toward said one end with a marginal dimension smaller than a marginal surface of the first portion, and being shaped for a force fit, airtight, sealing engagement with a correspondingly tapered, smaller opening of another fitting member.

* * * * *

UNITED STATES PATENT OFFICE
CERTIFICATE OF CORRECTION

Patent No. 4,138,890           Dated February 13, 1979

Inventor(s)     Joseph W. Brown

It is certified that error appears in the above-identified patent and that said Letters Patent are hereby corrected as shown below:

Column 4, Claim 1, line 40, delete "second" and in place thereof insert --first--.

Signed and Sealed this

Fifth Day of February 1980

[SEAL]

Attest:

SIDNEY A. DIAMOND

Attesting Officer           Commissioner of Patents and Trademarks